United States Patent

Bailey et al.

Patent Number: 5,689,273
Date of Patent: Nov. 18, 1997

[54] AIRCRAFT SURFACE NAVIGATION SYSTEM

[75] Inventors: Charles Gary Bailey, Phoenix; John Edward Hieber, Bel Air, both of Md.

[73] Assignee: AlliedSignal, Inc., Morris Township, N.J.

[21] Appl. No.: 594,099

[22] Filed: Jan. 30, 1996

[51] Int. Cl.⁶ .................................................. G01S 1/08
[52] U.S. Cl. ............... 342/407; 342/411; 342/412; 342/413; 364/429; 340/979
[58] Field of Search ............................. 342/410, 411, 342/412, 413, 444, 407; 455/41; 364/429; 340/957, 979

[56] References Cited

U.S. PATENT DOCUMENTS

| | | | |
|---|---|---|---|
| 2,391,079 | 12/1945 | Dyck | 342/414 |
| 3,505,676 | 4/1970 | Perkins | 343/107 |
| 3,653,047 | 3/1972 | Anthony | 343/106 R |
| 3,662,977 | 5/1972 | Shannon | 244/114 R |
| 3,754,262 | 8/1973 | Toman et al. | 343/108 R |
| 3,908,189 | 9/1975 | Buehler et al. | 343/5 LS |
| 4,004,758 | 1/1977 | Boriss et al. | 244/17.13 |
| 4,418,349 | 11/1983 | Höfgen et al. | |
| 4,733,833 | 3/1988 | Shepherd | 244/114 R |
| 5,144,315 | 9/1992 | Schwab et al. | |
| 5,218,360 | 6/1993 | Goetz et al. | |
| 5,262,784 | 11/1993 | Drobnicki et al. | |

*Primary Examiner*—Thomas H. Tarcza
*Assistant Examiner*—Dao L. Phan
*Attorney, Agent, or Firm*—Howard G. Massung; John J. Rafter; Verne E. Kreger, Jr

[57] ABSTRACT

A surface guidance system for guiding aircraft equipped with Instrument Landing Systems along taxiways which utilizes two inductive loops (14,16) installed around the right half and the left half of the taxiways. Audio amplifiers (18,20) drive one loop (14) with an 90 Hz signal and the other loop (16) at 150 Hz. A sensor (22) mounted on the aircraft detects the composite magnetic field induced by the surface loops (14,16). The detected signal is conditioned and supplied to the ILS system to provide left/right lateral guidance to the pilot. Longitudinal aircraft position is determined by using dipole marker antennas (52) embedded near the taxiway center line. Each marker antenna (52) has a unique code identifier. Existing ILS equipped aircraft can sense the marker signal and transmit the aircraft position to the ATC facility. Additional pairs of loops (14,16) and marker antennas (52) are used for different taxiway or runway sections.

12 Claims, 4 Drawing Sheets

AIRCRAFT SURFACE NAVIGATION SYSTEM

BACKGROUND OF THE INVENTION a. Field of the Invention

This invention relates generally to aircraft navigation on an airport surface and more particularly to a method for providing navigational guidance and position fixing of aircraft on the ground using conventional on board equipment of Instrument Landing System-equipped aircraft.

b. Description of Prior Art

Navigating an aircraft on a taxiway or a runway can be extremely difficult and dangerous under harsh weather conditions such as fog, rain or snow that severely limits pilot visibility. Reduced visibility is typically associated with Instrument Meteorological Conditions (IMC). An aircraft can approach and land using guidance from an Instrument Landing System (ILS) or Microwave Landing System (MLS) but must rely on the pilot's visual acuity to taxi the aircraft to the terminal area. The pilot must visually orient the aircraft to runway and taxiway markings and lights to properly exit the runway and taxi to the terminal.

Poor visibility, nighttime, and a pilot's uncertainty with a particular airport layout all reduce the pilot's ability to properly navigate the aircraft from the landing rollout position on the runway directly to the terminal ramp without making a wrong turn or exceeding the boundaries of the aircraft's taxi clearance. Unauthorized runway incursions, colliding with other taxiing or parked aircraft, or exceeding the boundaries of the taxiway are serious potential hazards under low visibility conditions.

Instrument Flight Rules (IFR)-certified aircraft generally have an ILS localizer receiver for left-right landing approach guidance. The localizer receiver detects a VHF (108.0–117.95 MHz) amplitude modulated (AM) signal having modulation components of 90 Hz and 150 Hz. The relative depth of modulation indicates the left-right position of the aircraft with respect to the intended approach path. After demodulation, the typical receiver separates (filters) the 90 Hz and 150 Hz modulation components and compares the respective amplitudes. The results of the comparison drives the left-right localizer needle of the Course Deviation Indicator (CDI). Equal amplitudes of the two components indicate course centerline.

During Visual Meteorological Conditions (VMC), pilots unfamiliar with the layout of larger airports may become unsure of their position on the airport taxiway and require directions from the ground controller. A positive position fixing method would relieve ground controller work load and aid in safer surface operations.

ILS equipped aircraft also have a 75 MHz marker receiver which marks the passage over the outer, middle and inner markers of an ILS approach. A typical marker beacon transmitter located on the ground has a gain antenna with an upward vertical radiation pattern that radiates at a carrier frequency of 75 Mhz with on-off keyed tone amplitude modulation of 400, 1300 or 3000 Hz depending on its location. The receiver on the aircraft uses a bottom-mounted antenna which requires rather low sensitivity. The receiver has three audio filters, so that the presence of one of three AM modulating frequencies, 400 Hz, 1300 Hz, or 3000 Hz illuminates one of three panel-mounted lights, blue, amber, or white, respectively. The lights are directly in the pilot's view, and the audio tone is injected into the pilot's headphones for audible identification.

Accordingly, there is a need to expedite surface traffic to and from the runway and terminal areas as landing capabilities continue to improve and aircraft traffic increases.

SUMMARY OF THE INVENTION

The present invention provides for a cost effective lateral guidance and position fixing system at selected points on the airport runway for aircraft surface operation during IMC and VMC conditions. Lateral guidance and position fixing information is provided to the pilot by existing familiar instrumentation. Position and aircraft identification are provided to ATC operations via an airport data link.

The lateral guidance system comprises multiple pairs of inductive loops installed along the runway and taxi area. Each loop transmits a controlled audio frequency magnetic field. The equipotential interface between the two magnetic fields defines the taxiway centerline. The magnetic runway/taxiway guidance signal is translated into a simulated localizer signal which is routed to the existing aircraft ILS localizer receiver. The pilot then receives steer-left/steer-right taxi guidance on the existing CDI localizer needle which acts very similar to guidance displayed during an ILS landing approach.

The position fixing system comprises small low-power 75 MHz marker beacon transmitters, or position fixes, installed along the runways/taxiways at intervals and runway intersections. The existing aircraft ILS marker receiver is used without modification to receive the runway/taxiway position fixes. The position fix information is decoded and appended to the aircraft ID before transmission to air traffic control operations.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF INVENTION

The following detailed description, which describes only the preferred embodiment of the invention, is understood only to be an illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

Figure 1:
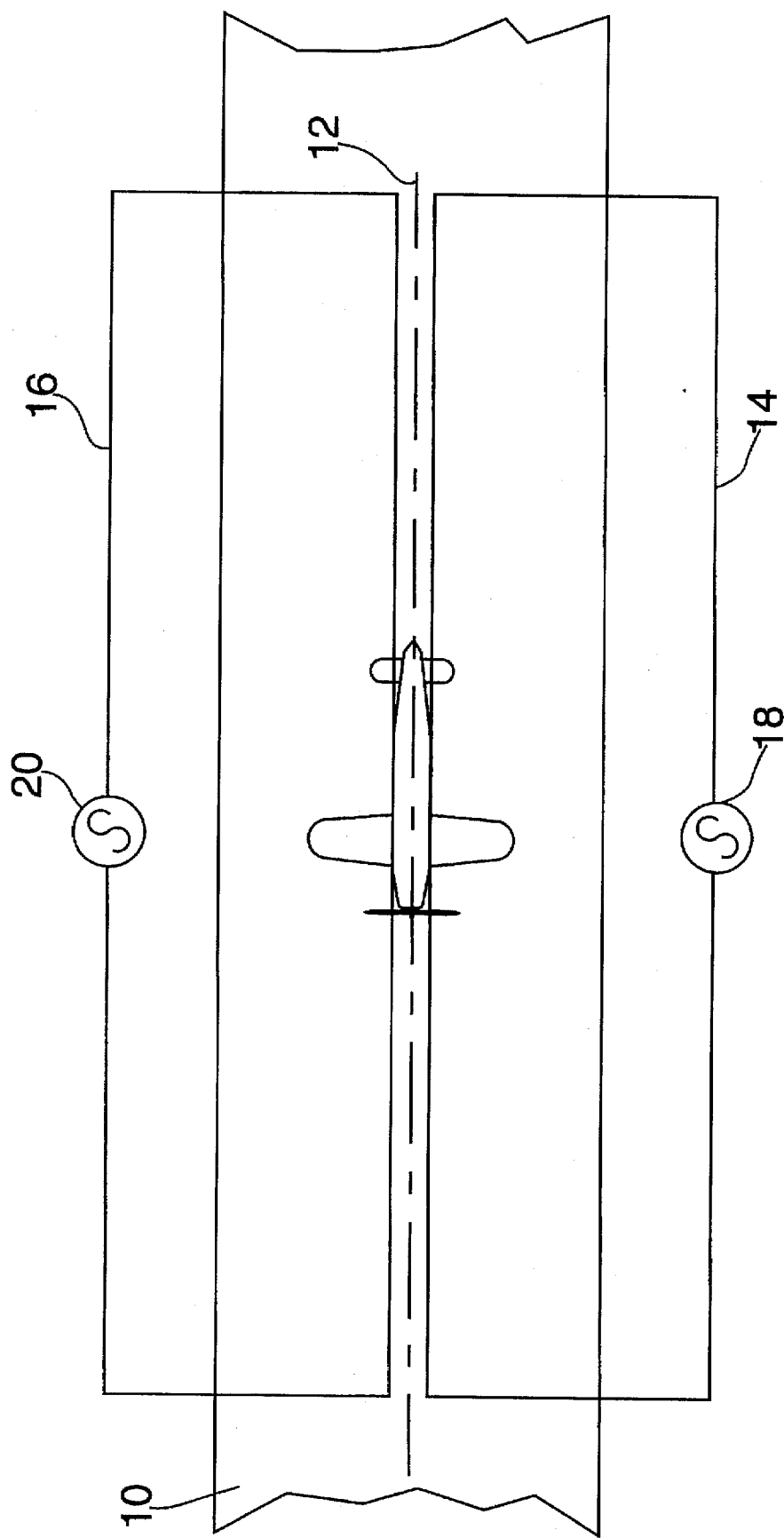
FIG. 1 illustrates the ground equipment according to the present invention for a lateral guidance control system.

The ground elements for one section of the lateral guidance system of the present invention are shown in FIG. 1. The magnetic left-right guidance reference signals are implemented by placing pairs of inductive loops 14 and 16 around the left and right halves of a taxiway or runway segment 10. A low-impedance loop driver 18 excites loop 14 with an alternating current at 90 Hz. A similar loop driver 20 excites loop 16 at 150 Hz. The lateral guidance path is obtained from the differential between the 90 Hz and 150 Hz magnetic fields. Proportional guidance is available in the center region 12 of runway 10 where the magnetic fields overlap. Clearance guidance exists to the far left and right edge to direct the pilot back to the centerline. Additional pairs of inductive loops 14 and 16 are used for additional sections of the lateral guidance system.

Figure 2:
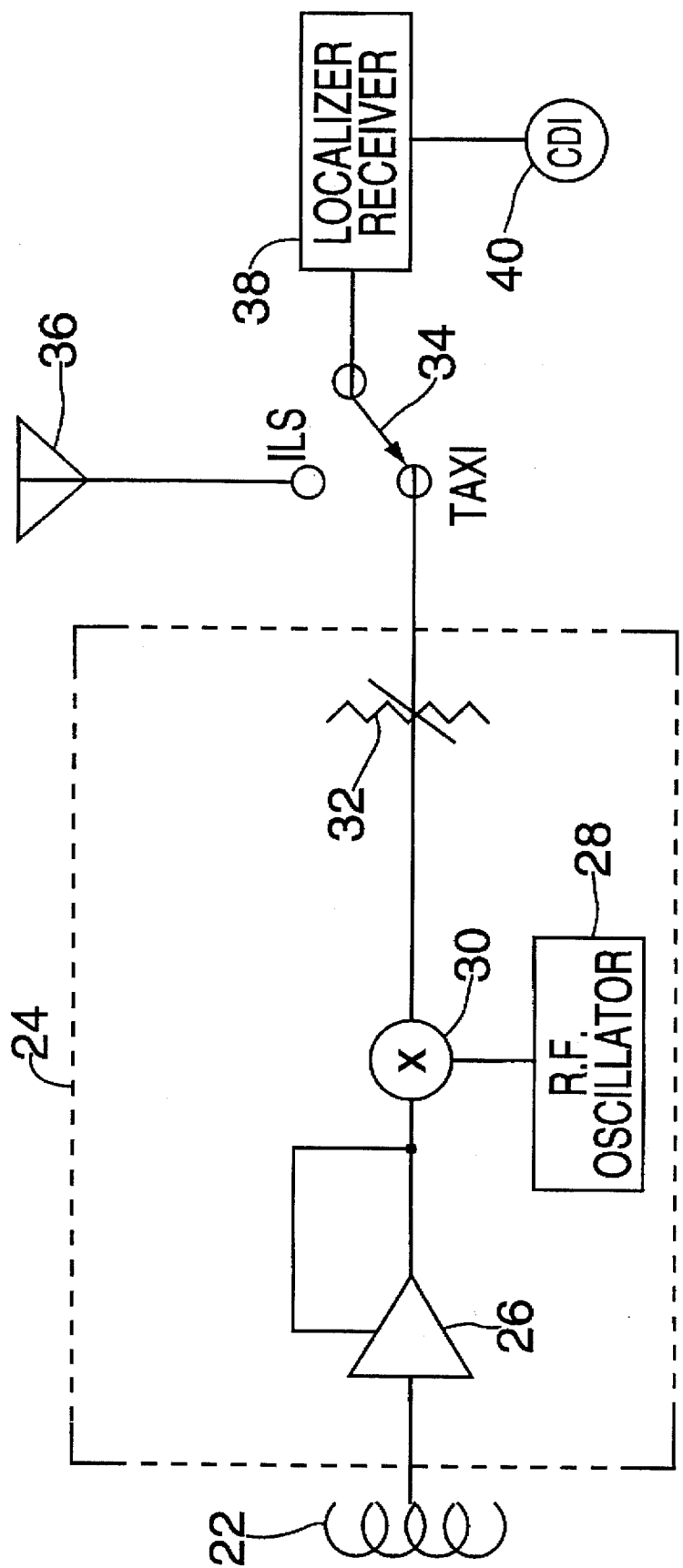
FIG. 2 illustrates the aircraft equipment according to the present invention for a lateral guidance control system.

The aircraft elements of the lateral guidance system are shown in FIG. 2. A low-profile inductive sensor 22 is mounted on the underside of the aircraft to receive the composite magnetic field induced by the two surface loops 14 and 16. The Surface Guidance Converter 24 takes the signal from sensor 22 and outputs an RF signal that appears to an existing ILS receiver 38 as a normal localizer signal. Surface Guidance Converter 24 consists of an audio amplifier 26, an RF oscillator 28, a mixer 30 and an RF attenuator 32. Audio amplifier 26 amplifies the audio signal from sensor 22 and provides the signal level required by mixer 30. Audio amplifier 26 contains an automatic gain control feedback loop to provide audio leveling at a relatively constant percent modulation. Oscillator 28 provides a fixed carrier frequency on one of the existing localizer channels. Mixer 30 amplitude modulates the carrier signal generated by oscillator 28, providing an output signal similar to that received during an ILS landing approach. Attenuator 32 reduces the relatively high RF signal to a level compatible with the localizer receiver 38 antenna input.

A switch 34 permits the pilot to select either the existing VHF navigation antenna 36 ("ILS" switch position) or the output of the Surface Guidance Converter 24 ("TAXI" switch position) as the input to the existing localizer receiver 38. When the pilot places the switch in the "TAXI" position, as shown in FIG. 2, the existing ILS CDI 40 localizer needle will indicate left-right deviation from the taxiway centerline. With the minor exception of the coaxial antenna switch 34, this modification is non-invasive to the existing localizer receiver 38 or its associated wiring. If desired, switch 34 may be activated automatically by means of a signal from a "weight on wheels" switch.

When taxiing in the reverse direction (terminal back to the runway), reverse needle sensing will occur, and the pilot will taxi the aircraft in a manner similar to flying a Back Course Localizer approach.

Figure 3:
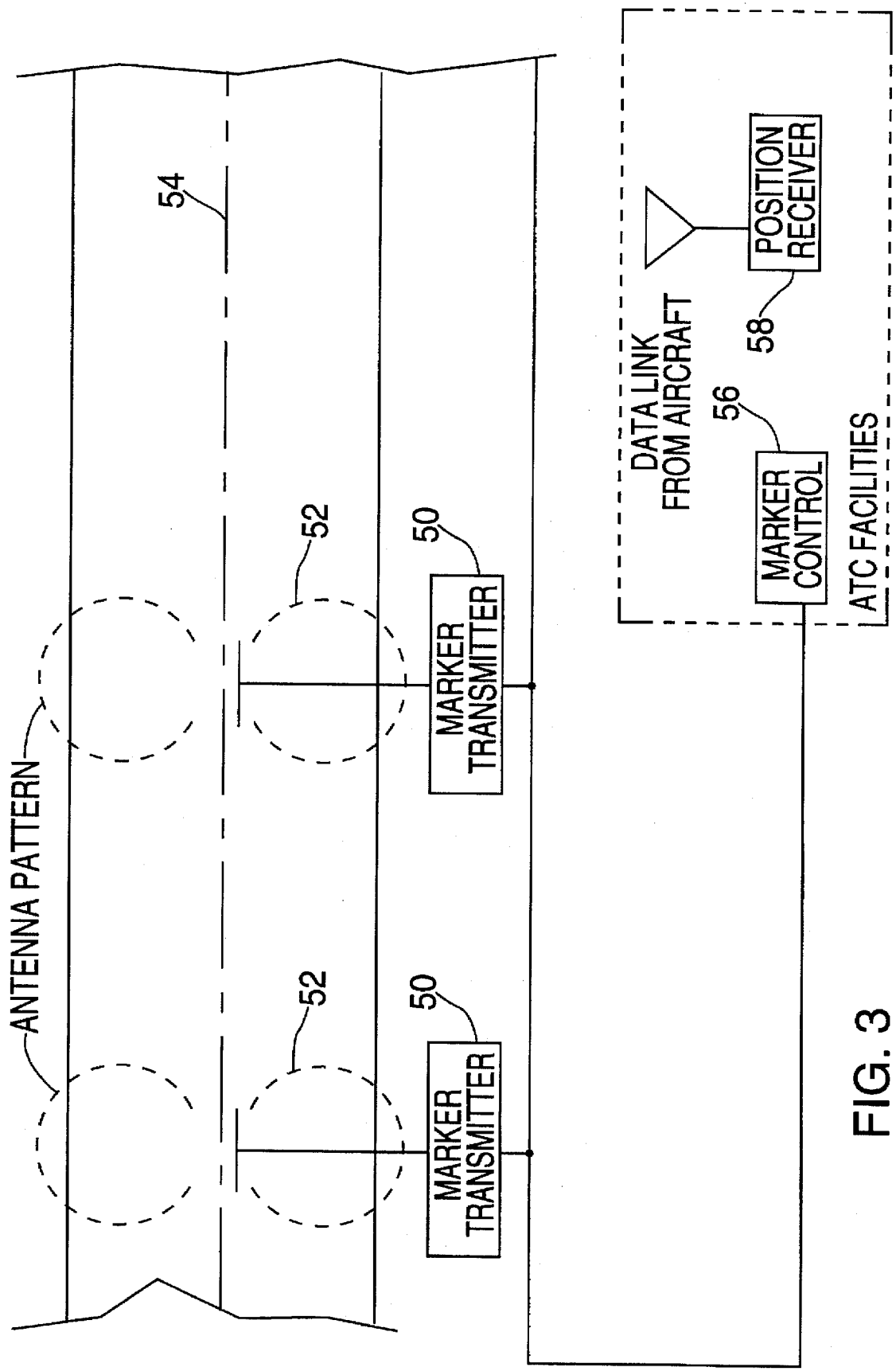
FIG. 3 illustrates the ground equipment according to the present invention for a position fixing control system.
Figure 4:
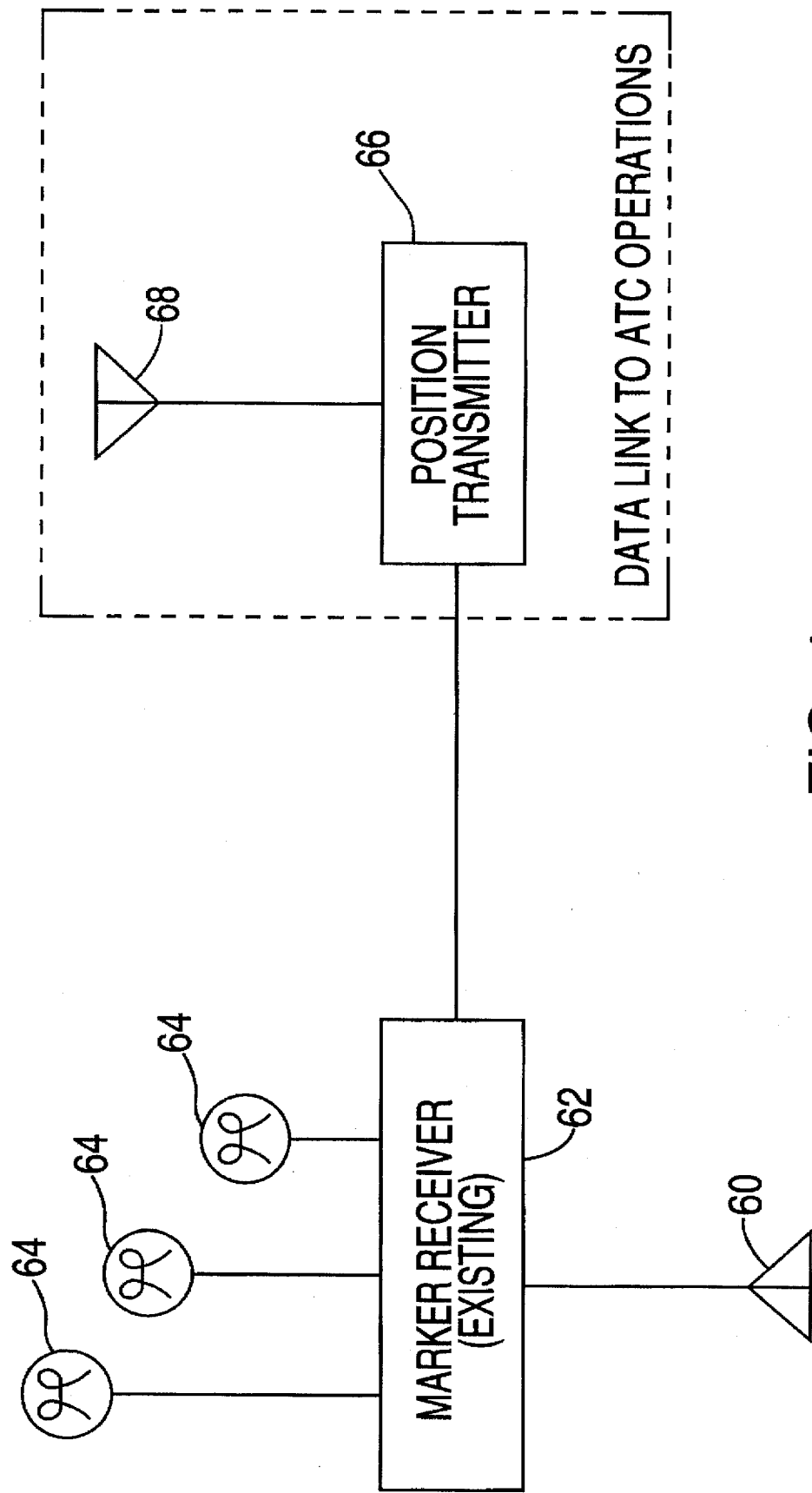
FIG. 4 illustrates the aircraft equipment according to the present invention for a position fixing control system.

In a further embodiment, as shown in FIGS. 3 and 4, the invention comprises means for determining the location of an aircraft while on a runway or a taxiway. Referring to FIG. 3, low power 75 MHz marker transmitters 50 are selectively located beside the taxiway. Each transmitter 50 is connected via coaxial transmission cables to a dipole antenna 52 which is positioned near the taxiway/runway centerline 54. The geometry and polarization of the aircraft and ground site antennas create a fan shaped beam, having its width laterally across the taxiway. The aircraft will cross the marker beam regardless of its lateral position as it passes along the taxiway.

The audio modulation frequency selection for each marker transmitter 50 of either 400, 1300 or 3000 Hz is sent via a control network 56 from the airport ATC operations. Preferably, the audio frequency of each marker transmitter would be selected to denote different operational areas, such as runways, taxiways, intersections, runway hold lines, and terminal areas. Preferably, the marker transmitter modulation assignment is 400 Hz (blue light) for all taxiway markers and 3000 Hz (white light) for all runway markers. In this instance, the marker indicator light would correspond to the runway or taxiway edge lighting color. The 1300 Hz (amber light) may signify a caution area, such as runway hold lines or taxiway intersections. The control link 56 allows operational changes, such as reconfiguring all markers on a closed runway or taxiway to 1300 Hz (amber).

The aircraft elements of position fixing are shown in FIG. 4. This embodiment utilizes the existing ILS marker antenna 60 and receiver 62 and panel lamps 64. Each marker transmitter 50 has a unique code (such as Morse) identifier therefore enabling positive position identification. A two character alphanumeric code will allow 1296 different marker positions. The pilot hears the unique Morse identification and sees one of the three lights illuminating as the aircraft crosses the radiation beam of each marker antenna 52. To report aircraft position to ATC operations, a data link transmitter 66 and antenna 68 are required. The position ID of the marker is decoded and appended to the aircraft's ID for transmission to the ATC facility's data link receiver 58.

The concept described herein provides a simple low cost guidance method for aircraft surface operation during IFR as well as VFR conditions. This "surface guidance" converter system allows navigation along a runway/taxiway slot regardless of its shape; it provides guidance along straight segments as well as curved segments. After landing, it provides guidance to transition from an ILS/MLS while on the runway, guides the turnoff onto the taxiway and then provides guidance along the taxiways to the gate area. Lateral guidance and longitudinal position information is provided to the pilot by existing instrumentation. Position and aircraft identification are provided to ATC via a local airport data link.

It will be understood that the particular embodiments described above are only illustrative of the principles of the present invention, and that various modifications could be made by those skilled in the art without departing from the scope and spirit of the present invention, which is limited only by the claims that follow.

We claim:

1. A ground guidance system for guiding an aircraft equipped with an Instrument Landing System (ILS) along a defined path comprising:

a pair of inductive loops, the first loop disposed around the right side half of the path and the second loop disposed around the left side half of the path;

a first audio amplifier for driving the first loop at a first audio frequency;

a second audio amplifier for driving the second loop at a second audio frequency;

an inductive sensor mounted on the aircraft for receiving the composite magnetic field induced by the pair of inductive loops;

signal processing means connected to said inductive sensor for converting the signal received by said inductive loop to an RF signal compatible with the aircraft ILS; and, indicator means in the ILS display responsive to the radio frequency signal from said signal processing means for providing an indication of deviation of the aircraft from the center line of the path for providing both lateral position guidance to the pilot of a taxiing aircraft.

2. A ground guidance system as claimed in claim 1 comprising a switch disposed between said signal processing means and said indicator means for selecting when the ground guidance system is operable.

3. A ground guidance system as claimed in claim 1 wherein said first audio frequency is 90 Hz and said second audio frequency is 150 Hz.

4. A ground guidance system as claimed in claim 1 comprising means for detecting the longitudinal position of the aircraft along the path.

5. A ground guidance system as claimed in claim 4 wherein said means for determining the longitudinal position of the aircraft comprises:

a dipole antenna, disposed near the center line of the path, which radiates a beam across the runway having unique position information;

a receiver located on the aircraft for receiving the unique position information; and means for appending information identifying the aircraft to the unique position information and for transmitting such information to an ATC facility.

6. A surface navigation system for navigating aircraft equipped with ILS on runways and taxiways comprising:

(a) first and second loop conductors capable of transmitting an audio frequency magnetic field and situated so that the equipotential interface between said conductors define the lateral centerline of said runway or taxiway;

(b) means for exciting said first and second loop conductors with an alternating current;

(c) aircraft receiver means for detecting said magnetic field signal of said first and second loop conductors;

(d) signal processing means for accepting the output of said aircraft receiving means and converting said output to an input signal compatible with said ILS; and (e) indicator means responsive to said ILS signal; wherein said indicator means indicates the position of said aircraft with respect to the lateral centerline.

7. The surface navigation system of claim 6 wherein said first conductor is excited at a frequency of 90 Hz, and said second conductor is excited at a frequency of 150 Hz.

8. The surface navigation system of claim 6 further comprising:

(f) a ground position signal transmitter positioned adjacent said runway or taxiway and having a gain antenna that radiates a carrier signal which modulates one of three audio frequencies;

(g) an aircraft ILS marker receiver having an antenna input for receiving said carrier frequency and generating an output responsive to said input to provide one of the three audio frequencies; and, (h) indicating means responsive to said output.

9. The surface navigation system of claim 8 wherein said indicating means comprises audio tones.

10. The surface navigation system of claim 8 wherein said indicating means comprises lights.

11. The surface navigation system of claim 8 further comprising:

an aircraft position transmitter connected to receive outputs from said ILS marker receiver; and, wherein said ground signal transmitters output contains a unique identifier code which is received by said ILS marker receiver via said antenna input, and said unique identifier code is appended to the aircraft ID code and transmitted by said position transmitter to the ATC facility.

12. The surface navigation system of claim 8 wherein the three audio frequencies are 400 Hz, 1300 Hz, and 3000 Hz.

* * * * *